Patented Nov. 12, 1935

2,020,421

UNITED STATES PATENT OFFICE 2,020,421

METHOD OF PRODUCING MERCAPTANS AND THIO-ETHERS

William M. Lee, Bala-Cynwyd, Pa.

No Drawing. Application December 23, 1932,
Serial No. 648,590

12 Claims. (Cl. 260—151)

The invention particularly relates to an improved method of forming sulphur compounds from the esters of secondary and tertiary alcohols, that is to say, those alcohols, and particularly tertiary alcohols, in which the carbon to oxygen bond is weak and the oxygen to hydrogen bond is relatively strong.

The object of the present invention is to provide a method or process for producing sulphur compounds, such as mercaptans, sulphides and thio-ethers by the reaction of hydrogen sulphide or by mercaptans themselves, with alkyl acid esters and/or neutral di-alkyl esters, separately or mixed together or admixed with the by-products of the esterification of the olefines, these by-products being olefines having a greater molecular weight than have those from which said esters may be produced, preferably by an acid treatment of the olefines.

A further object of this invention is to prepare mercaptans and other somewhat similar or related compounds by a process somewhat analogous to the hydrolytic treatments of the esters by cleaving the ester at the relatively weak alkyl-carbon to oxygen bond by and with hydrogen sulphide (H—S—H) in either the gaseous or liquid form and by that cleavage combining the sulphhydryl group of the hydrogen sulphide with the alkyl residue of the ester, and the residual hydrogen atom of the hydrogen sulphide with the acid residue of the split ester.

A further object of this invention is to provide a process by the practice of which a relatively high yield of sulphur compounds, such as the mercaptans and the thio-ethers are obtainable with greater ease than by the methods heretofore employed for the purpose, and by the practice of which the results of the reactions are more uniform and dependable.

Other objects of my invention will appear in the specification and claims below.

This invention relates to a new method for the production of certain mercaptans and related compounds such as sulphides and mixed thio-ethers, and especially for the production of secondary and/or tertiary alkyl mercaptans and their sulphides and mixed thio-ethers, the method comprising fundamentally the cleavage of the esters of secondary and/or tertiary alcohols by the use of reagents such as (1) hydrogen sulphide or (2) mercaptans themselves.

I have discovered that, with certain classes of esters, a process analogous to that of hydrolysis may be used to produce (1) sulphur compounds analogous to alcohols and (2) ethers; that is mercaptans and thio-ethers.

According to my discovery, esters of secondary and tertiary alcohols, when treated with hydrogen sulphide under suitable conditions, will cleave to yield sulphur compounds and sulphur-free compounds, i. e., the sulphur will unite with the alkyl group. For convenience, I have termed this process, "sulphydrolysis". The extent of the reaction and the nature of the products produced depend, however, upon the ester used, and upon the conditions and the media in which the reaction takes place.

The reaction of hydrolysis may be broadly represented:

$$R-OOCR^1 + HOH \rightleftharpoons ROH + HOOC-R^1$$

in which R and $R^1$ represent any alkyl radical.

In primary alcohols the carbon to oxygen bond is strong and the oxygen to hydrogen bond is weak; in tertiary alcohols the carbon to oxygen bond is weak and the oxygen to hydrogen bond is relatively strong; and in secondary alcohols, the relationship is intermediate. This relationship may be graphically represented, as follows, the relatively weak bonds being indicated by the broken lines:

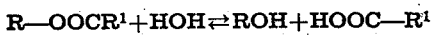 R—CH₂—O—H primary alcohols

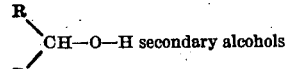 CH—O—H secondary alcohols

 R—C—O—H tertiary alcohols

In the esters of these types of alcohols this same relationship holds, and in the hydrolysis of these esters, the point of cleavage is at the weaker bond. I have discovered that when esters of tertiary alcohols, and to a somewhat less extent, esters of secondary alcohols, are cleaved by means of hydrogen sulphide, instead of by water, one atom of hydrogen attaches to the acid residue of the ester and the sulphydryl (—SH) group attaches to the alkyl residue of the ester.

The reaction may be graphically represented:

$$R-OOC-R' + H-SH \rightarrow RSH + R'-CO-OH$$

when R represents a secondary or tertiary alkyl grouping.

And I have further discovered that when esters of tertiary alcohols and, to a somewhat smaller extent, esters of secondary alcohols are cleaved, by means of mercaptans in place of water or of hydrogen sulphide, hydrogen is attached to the acid residue and the mercaptyl (—SR) group is attached to the alkyl residue.

This reaction may be graphically represented:

R—OOC—R'+R"—SH→
R—SR"+R'—CO—OH where R represents a tertiary alkyl grouping as above indicated, or analogously, a secondary grouping.

The reactions occur best with esters of tertiary alcohols; somewhat more difficulty with esters of secondary alcohols; and poorly, or not at all, with esters of primary alcohols, since the latter tend to cleave at a position which does not leave a free alkyl residue.

Although I have used, for the above primary illustrations, an ester of a carboxylic acid, I do not wish to be limited to the use of such esters, for I have further discovered that acid esters or normal esters of acids, such as sulphuric, phosphoric and acetic acids, all of which contain oxygen, may be advantageously used.

Nor, among the esters of carboxylic acids do I wish to be limited to monobasic acids, for I find that the acid esters or normal esters of acids such as oxalic acid may be used for my process. By the term "secondary esters" or "tertiary esters" I shall mean any esters, acid or neutral, of secondary or tertiary alcohols.

Secondary and tertiary esters may be prepared from the alcohols by any of the known methods of so producing such esters, or they may be advantageously prepared from the corresponding olefines and acids.

For instance, the olefines, except ethylene, dissolved in sulphuric acid of appropriate strengths will yield solutions containing neutral sulphates and/or acid sulphates of secondary and/or tertiary alcohols, such as are eminently suitable for the sulphydrolysis reaction. These processes and a specific description thereof are not needful to a full understanding of my invention.

Since secondary esters and particularly tertiary esters are not easy to prepare and isolate in pure form, I find it a preferred method of making secondary and/or tertiary mercaptans to utilize the secondary and/or tertiary esters obtained by the reaction of the olefines, except ethylene, with sulphuric acid or other suitable acid containing oxygen, and to carry out my procedure without isolating the esters used for the production of my sulphur compounds. I may, however, dissolve or react a secondary or tertiary alcohol in or with sulphuric acid or with any other suitable acid, containing oxygen, and of such strength or concentration as will react with the alcohol to produce an ester or esters substantially identical with the ester or esters produced from olefines and the same acid.

Straight chain olefines of the type

R.CH=CH.R'

(which excepts ethylene) will produce by reaction with suitable acids, secondary esters; and branched chain olefines of the type

in which the carbon atom, which carries a side chain, also carries the double bond, will produce by reaction with suitable acids, tertiary esters and in some instances also a small amount of secondary esters; and all other branched chain olefines produce with suitable acids, secondary esters.

For the preparation of tertiary mercaptans and/or thio-ethers, therefore, I may use esters prepared from olefines of the type in which the carbon atom, which carries a side chain, also carries the double bond. And for the preparation of mercaptans and/or thio-ethers I may use esters prepared from any other olefines except ethylene. If, in carrying out my invention, I use a mixture of esters prepared from a mixture of olefines including both of the types mentioned above, I obtain as a product comprising a mixture of secondary and tertiary mercaptans and/or thio-ethers.

For the preparation of secondary or tertiary esters of sulphuric acid from the various olefines, I attach a list of acid concentrations which may be used, but considerable variation is permissible in these acids concentrations, so I do not wish to be bound or limited by these examples.

For:—

| | Per cent sulphuric acid concentration |
|---|---|
| 2-methyl butene 2 | 62 |
| Pentene 2 | 66 |
| 2-methyl propene 2 | 70 |
| Butene 2 | 80 |
| Propene | 100 |

In performing the sulphydrolysis reaction on esters prepared by either of the methods above indicated, that is, on esters prepared by the reactions of olefines with suitable acids or by the reaction of secondary or tertiary alcohols with suitable acids, there should be present an excess of acid preferably, but not necessarily of the acid used in the production of the ester.

In the performance of the hydrolysis reaction, it is well known that the presence of free acid or free base is desirable. By analogous reasoning, free acid or the analogue of free base, should be present in a sulphydrolysis reaction. That is, if NaOH, sodium hydroxide were used in a hydrolysis reaction, NaSH, sodium hydrosulphide should be used in the corresponding sulphydrolysis reaction. Since hydrogen sulphide is a gas, and is therefore not readily usable as a solvent to carry sodium hydrosulphide into the field of reaction, and since the presence of free bases or their analogues in the field of the sulphydrolysis reaction will promote undesirable side reaction, such as the formation of disulphides of the types R—S—S—R or R—S—S—R', and for other reasons, I prefer the use of free acid.

I therefore find it a preferred method for the preparation of secondary and tertiary mercaptans and/or thio-ethers, to utilize the secondary and/or tertiary esters prepared by the reaction of olefines or secondary and/or tertiary alcohols, with sulphuric or other suitable acid, in the presence of an excess of the said acid.

I find that it is desirable to use for my process an ester, or mixture of esters containing as small a quantity of free water as is possible. This result is attained by using the maximum concentration of sulphuric or other suitable acid for reaction with the olefine or with the secondary or tertiary alcohols, as it is possible to use.

Having produced esters from olefines or from secondary or tertiary alcohols, by the use of a suitable acid, there takes place, in the presence of excess acid, a reaction by which are produced (1) free acid and (2) hydrocarbons polymeric with the original olefines or polymeric with olefines from which such secondary or tertiary alcohols were theoretically or actually derived by hydration.

The rate of this reaction is functionally dependent upon the temperature and upon the concentration of the acid which was used for the ester preparation.

I therefore find it desirable to select for each olefine or secondary or tertiary alcohol which is to be used for the ester preparation, an acid concentration, or a range of acid concentrations, which will produce an ester or a mixture of esters, together with excess acid, such as will produce polymeric hydrocarbons at a very slow rate, yet give the sulphydrolysis reactions at an advantageously high rate.

But the temperatures, herein referred to, are in general, those which result from chemical reactions of the materials under treatment. It is not generally necessary or desirable to heat the ingredients artificially before or during the process which may be and preferably is carried on at ordinary room temperatures. It is important, however, that my process be performed under conditions whereby the temperature of the mixture under treatment is not permitted to substantially rise, and the temperature can be held to a predetermined point. Small quantities of materials may thus be treated in a cold water or ice bath, while for large volume treatment any suitable controllable cooling system may be employed. This is what is referred to herein as the regulation or control of the temperature and the precautions against overheating.

I also find it desirable to select the temperature range at which sulphydrolysis is carried on, with regard to the rate at which the ester used will produce polymeric hydro-carbons, in the presence of the selected quantities of free acid and free water. As an exemplification of this, I may point out that, in general esters of secondary alcohols may be advantageously subjected to sulphydrolysis under the conditions named, at somewhat higher temperatures than esters of tertiary alcohols.

I further find that, for the production of secondary or tertiary mercaptans, it is desirable to add the hydrogen sulphide to the field of reaction as rapidly as possible, in order to inhibit side reactions such as will produce impurities of the types of di-(secondary-alkyl) sulphides and di-(tertiary alkyl) sulphides. Whereas, for the production of secondary or tertiary thio-ethers, it is not necessary to add the mercaptan rapidly.

I find it a suitable method of performing the sulphydrolysis reaction, to pass into the ester or esters, in the presence of free acid, and with suitable means for regulating and controlling the temperature, a rapid stream of hydrogen sulphide in the gaseous form, accompanying the passage of the gas with rapid agitation of the liquid. Excess hydrogen sulphide which is not dissolved and reacted may be allowed to leave the field of reaction and may be re-collected by any suitable means for repeated use. The reaction may, however, be carried on under pressure, instead of allowing free passage of the gas.

When more than one molecular part of the gas has been absorbed, the stream is stopped and the mixture is allowed to stand for a few minutes. It can readily be determined when the reaction has come to an end, by the continued presence of hydrogen sulphide in the field of reaction. The product of the reaction separates as a supernatant layer, or the separation may be facilitated by the addition of water, due to the fact that the products of the reaction are less soluble in weak acid.

When hydrogen sulphide is the reagent used, the product comprises a secondary and/or tertiary mercaptan containing, as by-products, small quantities of di(secondary alkyl) sulphides, (thio-ether) and/or di(tertiary-alkyl) sulphides (thio-ether), with possibly traces of other sulphur compounds such as disulphides, and some free acid in solution.

The supernatant layer is separated from the supporting liquid, is neutralized, dried and, if desired, distilled or fractionated to purify and to separate the mercaptans (alkyl hydrosulphides) from the by-products (thio-ethers).

If, instead of hydrogen sulphide, a mercaptan is used as the reagent to cleave the ester or esters, the same general procedure may be followed, save that the rate of addition of mercaptan need not be so rapid as that of hydrogen sulphide. The lower molecular weight mercaptans may, if desired, be added to the reaction as gases. The higher molecular weight mercaptans are preferably added as liquids. The product, again, separates as a floating layer. In this modification also water may be added to facilitate separation. The product is treated to purify it as with the mercaptans. It comprises secondary and/or tertiary alkyl-alkyl sulphides (thio-ether) with di(secondary alkyl) sulphide (thio-ether) and/or di-tertiary alkyl sulphide (thio-ether) as a by-product.

*Example I:*—An ester mixture comprising tertiary butyl acid sulphate, di(tertiary butyl) sulphate and sulphuric acid, is prepared by reacting one molecular part of isobutylene with cold 75-80% sulphuric acid in slight excess. With rapid agitation and precautions against heating, a strong stream of hydrogen sulphide is passed into the mixture. Almost at once an upper layer will begin to form. When slightly more than one molecular part of hydrogen sulphide has been passed, the stream is stopped and after a few minutes a drop of the lower layer (the supporting liquid) is removed and tested with lead acetate solution. The presence of free hydrogen sulphide is indicated by a black precipitate. If so indicated, the upper layer may be removed. Addition of water to the lower layer will give a slight additional separation due to the increased insolubility of the mercaptans and thio-ethers in the more dilute acid. The upper layer is washed until neutral with 10% sodium carbonate solution, dried with anhydrous potassium carbonate and distilled. The product is essentially tertiary butyl mercaptan.

*Example II.*—An ester mixture comprising tertiary amyl acid sulphate, di(tertiary amyl) sulphate and sulphuric acid, is prepared by reacting one molecular part of tertiary amyl alcohol with an excess of seventy-five percent sulphuric acid. With precautions against overheating and with suitable agitation, a slight excess over one molecular part of ethyl mercaptan is added. Stirring is continued until the reaction is complete. This can be determined by the continued presence of free mercaptans in the lower stratum, the presence of which is detected by its property of decolorizing iodine solutions. The upper layer is removed, washed, neutralized, dried and distilled. The product is essentially tertiary amyl ethyl sulphide.

claim and desire to protect by Letters Patent of the United States is:

1. The method of producing sulphur compounds which comprises treating olefin material containing over two carbon atoms with an oxygen acid adapted to react with said olefin to produce an alkyl ester of such acid and thereafter reacting the said ester with a compound containing a sulphydryl radical and chosen from the class consisting of mercaptans and hyrodgen sulphide to produce an alkyl substituted derivative of the sulphydryl radical containing compound corresponding in the carbon content of the added alkyl substituent to the original olefin.

2. The method of producing sulphur compounds which comprises treating olefin material containing over two carbon atoms with an oxygen acid adapted to react with said olefin to produce an alkyl ester of such acid and thereafter reacting the said ester in the presence of an acid catalyst with a compound containing a sulphydryl radical and chosen from the class consisting of mercaptans and hydrogen sulphide to produce an alkyl substituted derivative of the sulphydryl radical containing compound corresponding in the carbon content of the added alkyl substituent to the original olefin.

3. The method of producing sulphur compounds which comprises treating olefin material containing over two carbon atoms with a molecular excess of an oxygen acid adapted to react with said olefin to produce an alkyl ester of such acid and thereafter reacting the said ester in the presence of unreacted acid with a compound containing a sulphydryl radical and chosen from the class consisting of mercaptans and hydrogen sulphide to produce an alkyl substituted derivative of the sulphydryl radical containing compound corresponding in the carbon content of the added alkyl substituent to the original olefin.

4. The method of producing sulphur compounds which comprises treating olefin material containing over two carbon atoms with an oxygen acid adapted to react with said olefin to produce an alkyl ester of such acid and thereafter reacting the said ester with a mercaptan to produce a thio-ether.

5. The method of producing alkyl mercaptans which comprises treating olefin material containing over two carbon atoms with an oxygen acid adapted to react with said olefin to produce an alkyl ester of such acid and thereafter reacting the said ester with hydrogen sulphide to produce the desired alkyl mercaptan.

Having thus described my invention, what I

6. The method of producing alkyl mercaptans which comprises treating olefin material containing over two carbon atoms with a molecular excess of an oxygen acid adapted to react with said olefin to produce an alkyl ester of such acid and thereafter reacting the said ester with hydrogen sulphide in the presence of an acid to produce the desired mercaptan.

7. The method of producing sulphur compounds which comprises treating olefin material containing over two carbon atoms with an oxygen acid adapted to react with said olefin to produce an alkyl ester of such acid and thereafter reacting the said ester in the presence of an acid with hydrogen sulphide to produce the desired mercaptan.

8. The method of producing alkyl mercaptans which comprises treating olefin material containing over two carbon atoms with an oxygen acid adapted to react with said olefin to produce an alkyl ester of such acid and thereafter treating the said ester with a molecular excess of hydrogen sulphide to produce the desired mercaptan.

9. The method of producing sulphur compounds which comprises reacting an alkyl ester chosen from the class consisting of secondary and tertiary alkyl esters of oxygen acids with hydrogen sulphide in an acid medium.

10. The method of producing sulphur compounds which comprises reacting an alkyl ester chosen from the class consisting of secondary and tertiary alkyl esters of oxygen acids with a compound having the formula R—SH in which R represents hydrogen or an alkyl or aryl radical, such reaction taking place in the presence of an acid catalyst.

11. The method of substituting a radical chosen from the class consisting of secondary and tertiary alkyl radicals for a hydrogen atom of a compound having the formula R—SH in which R represents hydrogen or an alkyl or aryl radical, which comprises reacting an alkyl ester corresponding in its alkyl radical to the desired substituents with the said compound.

12. The method of substituting a radical chosen from the class consisting of secondary and tertiary alkyl radicals for a hydrogen atom of a compound having the formula R—SH in which R represents hydrogen or an alkyl or aryl radical, which comprises reacting an alkyl ester corresponding in its alkyl radical to the desired substituent with the said compound in the presence of an acid catalyst.

WILLIAM M. LEE.